United States Patent [19]
Robb

[11] Patent Number: 5,931,738
[45] Date of Patent: Aug. 3, 1999

[54] UNIVERSAL JOINT ASSEMBLY PROTECTED BY A BOOT

[75] Inventor: Scott B. Robb, Toledo, Ohio

[73] Assignee: Dana Corporation, Toledo, Ohio

[21] Appl. No.: 08/955,055

[22] Filed: Oct. 21, 1997

[51] Int. Cl.[6] .................................................. F16D 3/84
[52] U.S. Cl. ........................ 464/140; 277/636; 464/175
[58] Field of Search .................... 464/140, 162, 464/170, 173, 175; 403/50, 51; 277/636, 635, 634

[56] References Cited

U.S. PATENT DOCUMENTS

| | | | |
|---|---|---|---|
| Re. 34,341 | 8/1993 | Fukumura et al. ...................... | 464/175 |
| 2,451,791 | 10/1948 | Weaver . | |
| 2,702,996 | 3/1955 | Davis . | |
| 3,747,368 | 7/1973 | Morin . | |
| 3,962,889 | 6/1976 | Stillwagon, Jr. . | |
| 4,360,209 | 11/1982 | Ukai et al. ............................... | 277/636 |
| 4,556,400 | 12/1985 | Krude et al. ............................. | 277/636 |
| 4,664,393 | 5/1987 | Hazebrook .............................. | 464/173 |
| 4,805,921 | 2/1989 | Ukai et al. ............................... | 277/636 |
| 4,820,238 | 4/1989 | Uchida et al. ........................... | 464/175 |
| 4,877,258 | 10/1989 | Alt et al. . | |
| 4,927,678 | 5/1990 | Lallement .............................. | 464/175 |
| 5,052,979 | 10/1991 | Welschof et al. ....................... | 464/140 |
| 5,312,300 | 5/1994 | McGregor et al. ..................... | 277/636 |
| 5,692,962 | 12/1997 | Fukumura et al. ..................... | 464/173 |

FOREIGN PATENT DOCUMENTS

| | | | |
|---|---|---|---|
| 2804339 | 8/1978 | Germany ............................... | 464/175 |
| 288727 | 12/1987 | Japan .................................... | 464/170 |
| 2-225826 | 9/1990 | Japan .................................... | 464/170 |
| 799402 | 8/1958 | United Kingdom .................. | 464/175 |
| 2238844 | 6/1991 | United Kingdom .................. | 464/175 |

*Primary Examiner*—Eileen Dunn Lillis
*Attorney, Agent, or Firm*—MacMillan, Sobanski & Todd, LLC

[57] ABSTRACT

A half shaft assembly includes a half shaft having inboard and outboard ends with constant velocity universal joint inner races secured thereto. A universal joint cage and ball assembly encircles each inner race. An outer race encircles each cage and ball assembly. A protective elastomeric convoluted semi-hyperbolic boot is provided. The boot has divergent inboard and outboard ends and a convergent center. The convergent center has an inner diameter sized to fit snugly around the half shaft. The divergent inboard and outboard ends are secured to their respective inboard and outboard constant velocity universal joint outer races by a separate clamp.

10 Claims, 5 Drawing Sheets

# 5,931,738

1

UNIVERSAL JOINT ASSEMBLY PROTECTED BY A BOOT

BACKGROUND OF THE INVENTION

This invention relates to a half shaft assembly and in particular a half shaft assembly utilized to rotatively drive a vehicle wheel.

Automotive vehicles have a rigid frame commonly referred to as a chassis. The chassis is typically supported on four or more wheels by a suspension system. The suspension system includes a spring and a damper commonly referred to as a shock absorber or strut. The suspension system allows for relative movement between the wheel of the vehicle and the chassis while still supporting the vehicle. Relative movement between the chassis and wheel is required to allow the wheel to react to a contour of a road surface. In the case of drive wheels, the suspension system must provide for relative movement between the wheel of the vehicle and the chassis while still driving the vehicle. Additionally, on the front end of the vehicle, the suspension system accommodates a steering system to direct the vehicle by turning the vehicle front wheels.

An engine which powers the vehicle is rigidly connected to the chassis. An output shaft of the engine transfers torque to a transmission. The transmission is also rigidly connected to the chassis. In a front wheel drive vehicle the engine and transmission are typically mounted to the chassis transverse to a vehicle's major axis, and a transaxle associated with the transmission transfers torque to the front wheels. For purposes of discussion, as used herein the term "transmission" is inclusive of a transaxle.

A separate half shaft assembly, sometime referred to as a stub shaft, is commonly used to transfer torque from the transmission to each front wheel. The half shaft assembly includes a half shaft mounted transverse to the major longitudinal axis of the vehicle. The half shaft has an inboard end mechanically coupled to a transmission output shaft. The half shaft has an outboard end mechanically coupled to a wheel axle.

A universal joint is a mechanical coupling device which provides a rotational driving connection between two rotatable shafts, while permitting such shafts to be oriented at an angle relative to one another. In the example of a front wheel drive vehicle, an outboard universal joint is used to provide a rotational driving connection between the half shaft and the front wheel axle of the vehicle. An inboard universal joint provides a mechanical coupling between the half shaft and the output shaft of the transmission. The universal joints allow the transmission to be fixed to the chassis while the wheel has relative movement with respect to the chassis.

Universal joints are commonly classified by their operating characteristics. One important operating characteristic relates to the relative angular velocities of the two shafts connected thereby. In a constant velocity type of universal joint, the instantaneous angular velocities of the two shafts are always equal, regardless of the angle of rotation. In a non-constant velocity or Cardan type of universal joint, the instantaneous angular velocities of the two shafts vary with the angle of rotation, although the average angular velocities for a complete rotation of each driveshaft are equal.

A typical structure for a constant velocity universal joint includes a cylindrical inner race connected to a first rotative shaft and a hollow cylindrical outer race connected to a coupled second rotative shaft. The outer surface of the inner race and the inner surface of the outer race have respective pluralities of grooves formed therein. The grooves extend linearly, i.e., generally in the direction of the driveshafts, and have generally semi-circular cross sectional shapes. Each groove formed in the outer surface of the inner race is associated with a corresponding groove formed in the inner surface of the outer race. A torque transmitting ball is disposed in each of the associated pairs of grooves. The balls provide a driving connection between the inner and outer races. An annular cage is typically provided between the inner and outer races for retaining the balls in the grooves. The cage is provided with a plurality of circumferentially spaced openings for the above noted purpose.

In a typical half shaft assembly for a front wheel drive vehicle, constant velocity universal inner joint races are connected to outboard and inboard ends of the half shaft. Outer constant velocity universal joint races are connected to the front wheel axle and to an output shaft of the transmission. Constant velocity universal joints are lubricated with a grease lubricant. Constant velocity universal joints should be protected from dirt, moisture and other environmental contaminates which could damage the universal joint. A first flexible convoluted boot is provided to protectively enclose the inner and outer races of the inboard constant velocity joint. A second flexible convoluted boot is provided to protectively enclose the inner and outer races of the outboard constant velocity joint. Each of the boots requires two clamps. One clamp secures a first convergent end of the boot to the half shaft. A second clamp secures a second divergent end of the boot to the outer race of the universal joint. It would be desirable to replace the two required protective boots with a single boot to simplify the half shaft assembly. It would be desirable to lower the amount of clamps required, thereby lowering the material cost and assembly time required for the half shaft assembly.

SUMMARY OF THE INVENTION

The above objects as well as other objects not specifically enumerated are achieved by a half shaft assembly that includes an output shaft for a transmission, a wheel axle, a half shaft, the half shaft having an inboard end and an outboard end, an inboard universal joint secured to the inboard end of the half shaft and also secured to the transmission output shaft, an outboard universal joint secured to the outboard end of the half shaft and also secured to the wheel axle, and a boot for protecting the inboard and outboard universal joints, the boot having generally divergent inboard and outboard ends and a convergent center, the convergent center having an outer diameter sized substantially smaller than the largest outer diameter of the inboard and outboard divergent ends, the inboard divergent end of the boot being secured to the transmission output shaft, and the outboard divergent end of the boot being secured to the wheel axle.

In a preferred embodiment of the invention the universal joints are constant velocity universal joints, and the inner joint races are connected to outboard and inboard ends of the half shaft. The outer constant velocity universal joint races are provided for coupling to a wheel axle and to an output shaft of the transmission. A single protective boot with a convergent center and divergent opposite ends is provided. The boot preferably has a semi-hyperbolic shape.

DETAILED DESCRIPTION OF THE PREFERRED EMBODIMENT

Figure 1:
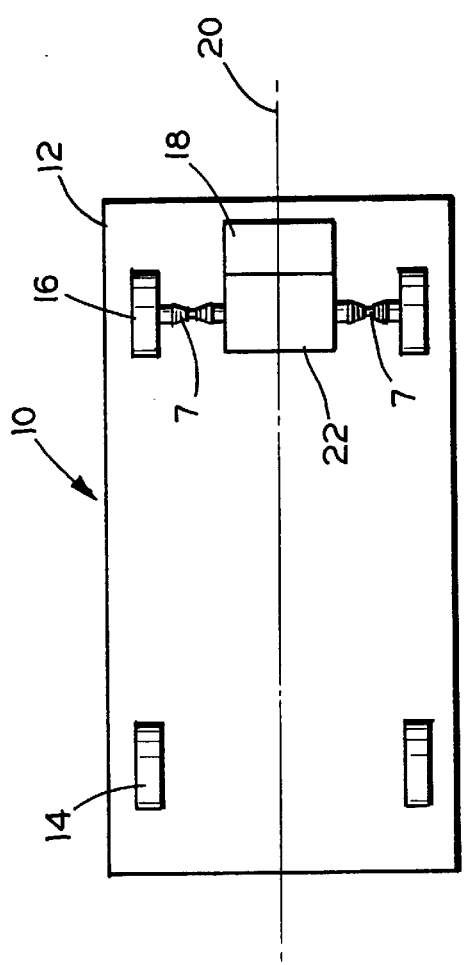
FIG. 1 is a schematic view of a vehicle and vehicle power train with a half shaft assembly according to the present invention.
Figure 2:
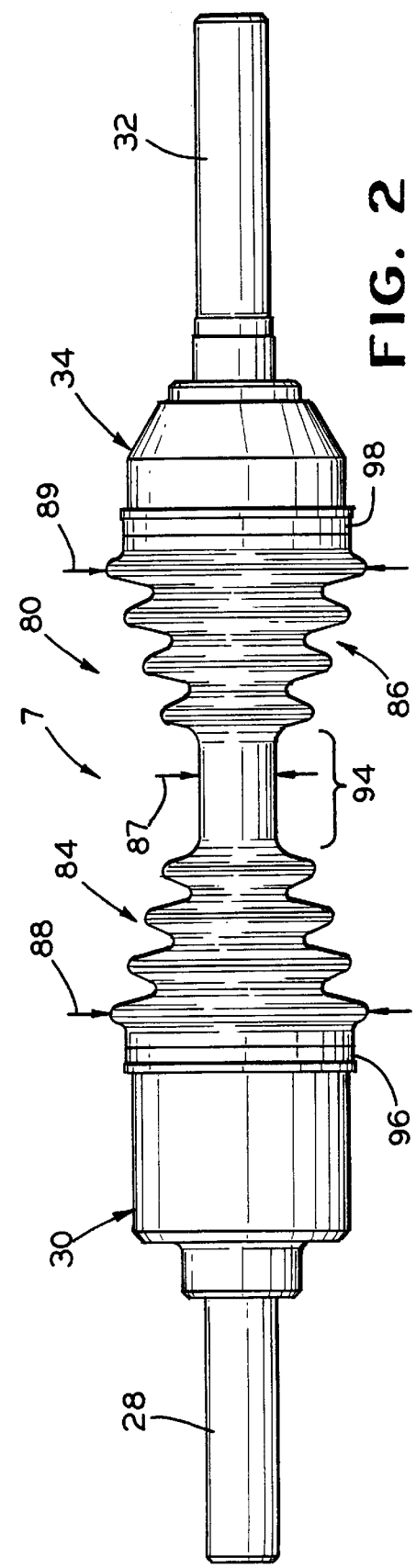
FIG. 2 is a side elevational view of the half shaft assembly shown in FIG. 1.

Referring to FIG. 1, an automotive vehicle 10 has a rigid frame or chassis 12. The chassis 12 is supported on a pair of rear wheels 14 and front wheels 16. Juxtaposed between the chassis 12 and each of the rear and front wheels 14, 16 is a suspension system (not shown). The suspension system allows the rear and front wheels 14, 16 to follow the contour of a road surface. Therefore the front and rear wheels 14, 16 can have relative movement with respect to the chassis 12. In a manner well known in the art, the vehicle 10 can also has a steering system (not shown) to turn the front wheels 16.

An engine 18 is provided to power the vehicle 10. In the embodiment shown, the engine 18 is positioned transverse to a major axis 20 of the vehicle 10, although the engine could be axially oriented as well. The engine 18 is mounted rigidly to the chassis 12. The engine 18 transfers torque to a transmission 22. The transmission 22 is also rigidly mounted to the chassis 12. The transmission 22 transfers torque to the front wheels 16. To transfer torque from the transmission 22 to each one of the front wheels 16, there is provided a present inventive half shaft assembly 7.

Figure 3:
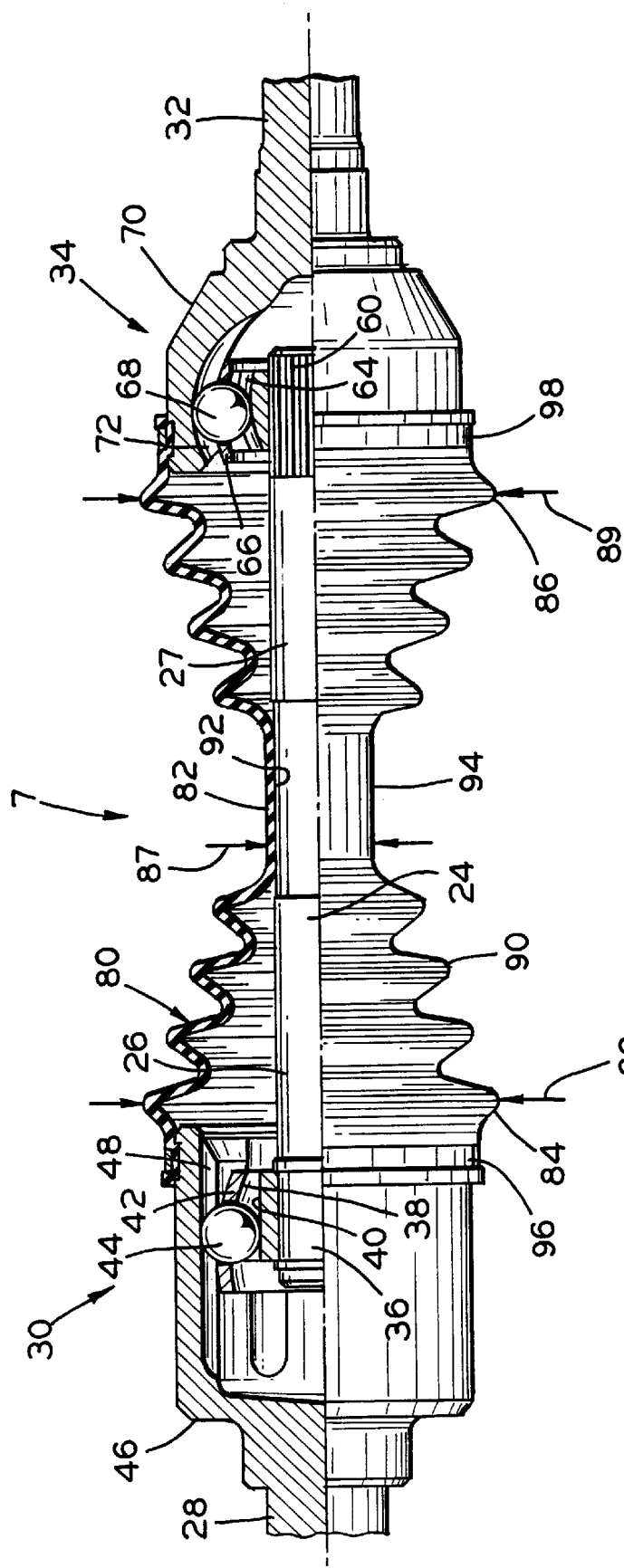
FIG. 3 is a enlarged side elevational view of the half shaft assembly shown in FIG. 2 with portions sectioned.

The half shaft assembly 7 includes a half shaft 24, as shown in FIG. 3. The half shaft 24 is formed from a solid stock of metal. An inboard end 26 of the half shaft is pivotally rotatively coupled with an output shaft 28 of the transmission. The above noted pivotal coupling is accomplished by an inboard constant velocity universal joint 30. An outboard end 27 of the half shaft is pivotally rotatively coupled with a wheel axle 32. The half shaft to wheel axle pivotal coupling is accomplished by an outboard constant velocity universal joint 34.

The half shaft inboard end 26 has secured thereto a constant velocity universal joint inner race 36. The inner race 36 along an outer surface 38 has a series of geometrically spaced linear grooves 40. The grooves 40 have a semi-circular or other similar cross-sectional shape with a linear axis that is alternately inclined with respect to a major axis of the half shaft 24.

A constant velocity universal joint cage 42 and series of geometrically spaced balls 44 form a cage and ball assembly. The cage 42 and balls 44 encircle the inner race 36. The cage 42 retains the balls 44 in the their respective grooves 40.

Encircling the cage 42 and balls 44 is an inboard constant velocity universal joint outer race 46. The outer race 46 is typically formed integrally with the transmission output shaft 28, or at least rigidly connected for rotation with the transmission output shaft 28.

The outer race 46 has a series of geometrically spaced linear grooves 48 corresponding with the grooves 40 in the surface of the inner race 36. The grooves 48 have a semi-circular or other similar cross-sectional shape with a linear axis. The grooves 48 are alternately or cross inclined with respect to the grooves 40. One of the balls 44 is disposed in each one of the paired grooves 40, 48. The balls 44 provide a torsional association or driving connection between the outer race 46 and the inner race 36 while allowing the transmission output shaft 28 and the half shaft 24 to rotate on non-collinear axes.

The half shaft outboard end 27 has secured thereto a constant velocity universal joint inner race 60. The inner race 60 along a curvilinear outer surface 62 has a series of geometrically spaced curvilinear grooves 64. The grooves 64 have a semi-circular or other similar cross-sectional shape with a curvilinear axis that is inclined with respect to a major axis of the half shaft 24.

A constant velocity universal joint cage 66 and series of geometrically spaced balls 68 form a cage and ball assembly. The cage 66 and balls 68 encircle the inner race 60. The cage 66 retains the balls 68 in the their respective grooves 64.

Encircling the cage 66 and ball 68 assembly is an inboard constant velocity universal joint outer race 70. The outer race 70 is typically formed integrally with the is wheel axle 32.

The outer race 70 has a series of geometrically spaced curvilinear grooves 72 to associate with the grooves 64. The grooves 72 have a semi-circular or other similar cross-sectional shape with a curvilinear axis. The grooves 72 are alternately or cross inclined with respect to the grooves 40. One of the balls 68 is disposed in each one of the paired grooves 64, 72. The balls 68 provide a torsional association or driving connection between the outer race 60 and the inner race 70 while allowing the transmission output shaft 28 and the half shaft 24 to rotate on non-collinear axes.

The half shaft assembly 7 has a protective boot 80. The boot 80 is fabricated from an elastomeric material. The boot 80 has a semi-hyperbolic shape with a convergent center 82 and divergent inboard and outboard ends 84, 86, although other shapes can be used. An outer diameter 87 of the center 82 is significantly smaller than the outer diameter 88 of the inboard divergent end 84 or the outer diameter 89 of the outboard divergent end 86. The boot 80 has convolutions 90 to allow for bending motion of the constant velocity universal joints 30, 34. Preferably, the largest outer diameter 88 or 89 at either end of the boot 80 is larger than the diameter 87 of the boot at the center of the boot by a ratio of at least 3:1. In some cases this ratio is at least 6:1.

As shown in FIG. 3, an inner diameter 92 of the convergent center 82 is sized to fit snugly around the half shaft 24 to prevent relative movement of the boot 80 with respect to the half shaft 24. Preferably, the clearance between the boot and the shaft is no more than about 0.020 inches, and most preferably no more than about 0.010 inches. The outer and inner diameters 87, 92 of the convergent center extend a relatively short distance forming a flat section 94 having generally flat or constant inner and outer diameters. The inboard divergent end 84 is secured to the outer race 46 by a clamp 96. In like manner the outboard divergent end 86 is secured to the outer race 70 by a clamp 98. Based on the snug fit of the inner diameter 92 of the boot, and the clamping of the boot to the outer races 46 and 70, it can be seen that the boot will rotate in unison with the output shaft 28, the half shaft 24, and the wheel axle 32. The effect of using the unified boot 80 in place of two separate boots, not shown, is that only two clamps are required for the entire boot assembly, and no clamp is needed at the center of the half shaft. This is advantageous because it saves assembly labor and material cost. Optionally, a single clamp, not shown, can be placed around the convergent center 82 to secure the convergent center to the half shaft. One of the primary benefits of the half shaft assembly of the invention is that there is no longer an exposed center portion of the half shaft subject to rust and corrosion. Therefore, the half shaft need not be painted or otherwise treated for resistance to the elements. The entire half shaft is protected by the boot, whereas the prior art half shaft assemblies had spaced apart boots.

Figure 4:
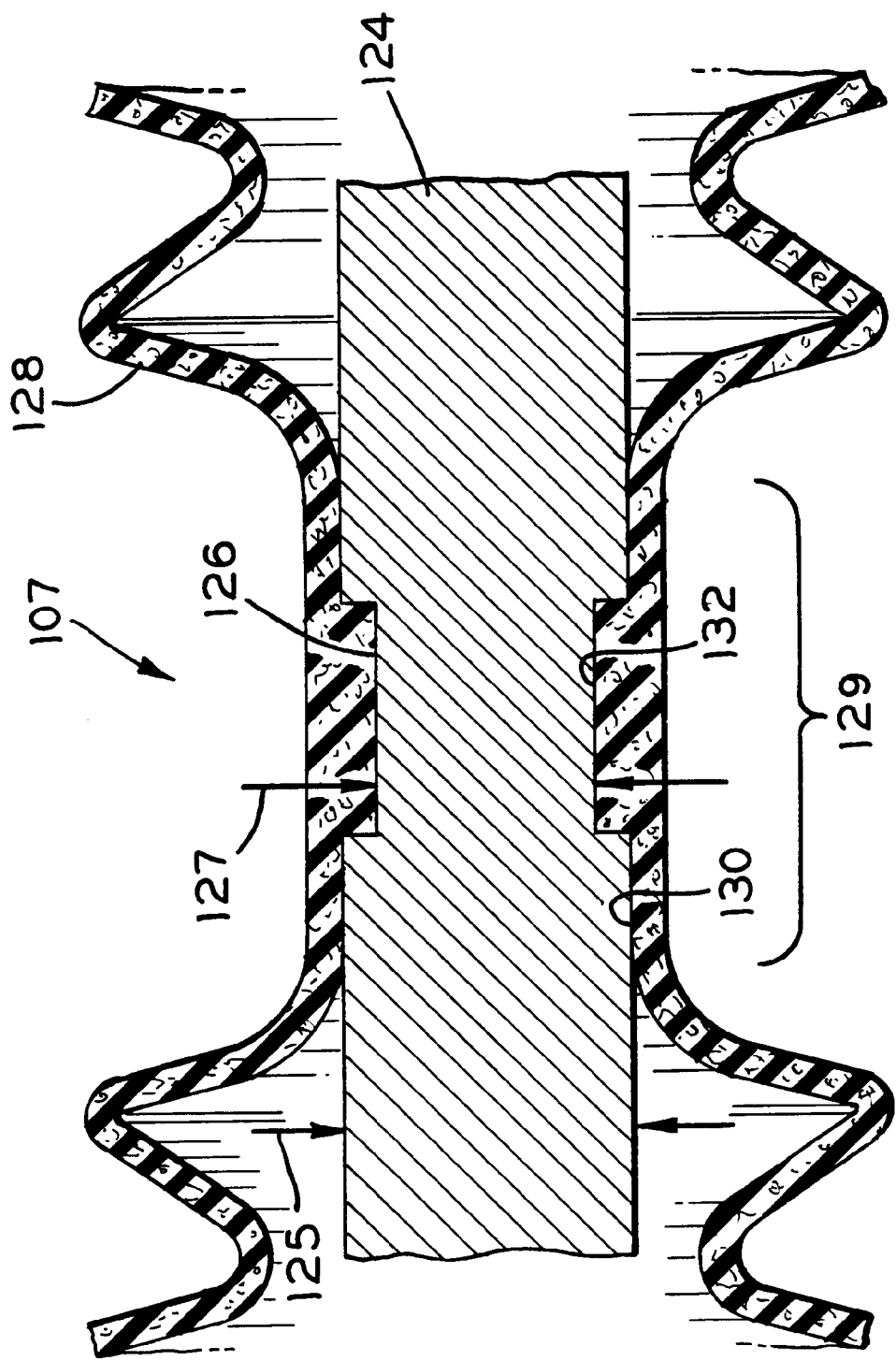
FIG. 4 is a partial enlarged sectional view of an alternate embodiment of a half shaft assembly according to the present invention.

Referring to FIG. 4, an alternate embodiment half shaft assembly 107 is partially shown. The half shaft assembly 107 is substantially similar to the half shaft assembly 7 with some notable modifications. The half shaft assembly 107 has a half shaft 124, having a diameter 125. At a location near the center of the half shaft, the half shaft has an annular groove 126 with a diameter 127 that is less than the diameter 125 of the half shaft. A protective boot 128 has a convergent center portion 129. Along an inner diameter 130 of the convergent center portion, an inward facing circumferential or annular ridge 132 is positioned. This ridge has a diameter smaller than the diameter 125 of the half shaft. The annular ridge is sized to fit snugly within and around the annular groove 126. If desired, the circumferential ridge 132 may have radial and axial interference with the annular groove 126. The advantage of the cooperating annular groove 126 and the annular ridge 128 is that the boot is restricted from moving axially with respect to the half shaft 124, and yet in many if not all applications, the snug fit of the boot's convergent center around the half shaft will delete any requirement of clamp attachment of the boot to the half shaft. Therefore, in most embodiments the inventive half shaft assembly will only require two end clamps for securing the boot to the outer races.

An additional benefit of the invention shown in FIG. 4 is that as the boot 128 is being moved or slid along the half shaft during assembly, the mating of the annular ridge 132 and the annular groove 126 will enable the installer to know that the boot has been moved into the desired axial location on the half shaft. In this respect, the cooperating annular ridge 132 and the annular groove 126 act as a general indicator for the installer as to whether or not the boot has reached the axial location desired for proper assembly.

Figure 5:
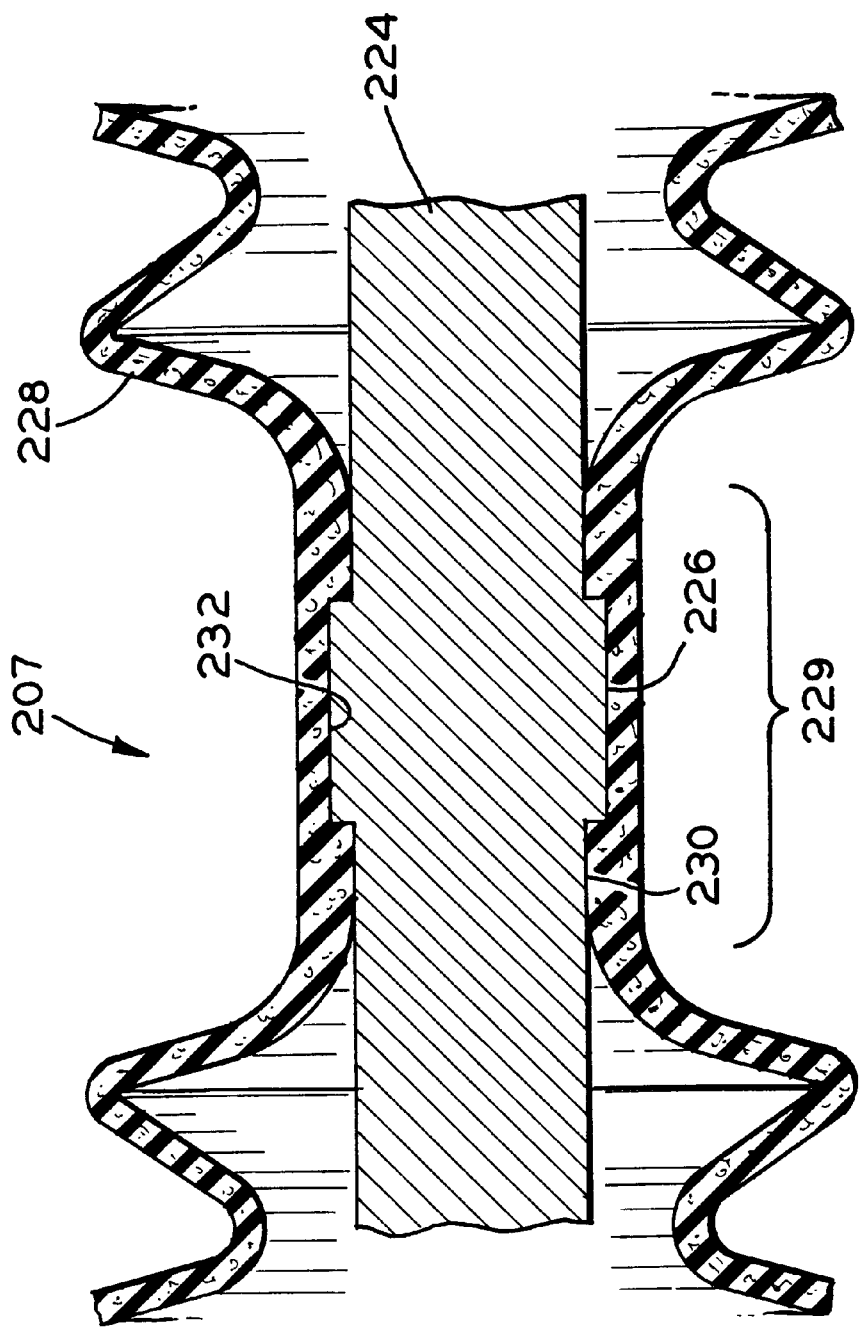
FIG. 5 is a view similar to FIG. 4 of another embodiment of a half shaft assembly acceding to the present invention.

It is to be understood that the function of indicating the actual axial position of the boot could take other forms. In the embodiment shown in FIG. 5, for example, half shaft assembly 207 is substantially similar to the half shaft assembly 107 shown in FIG. 4, with the difference being that fact that the half shaft 224 is provided with an annular ridge 226 rather than an annular groove. A protective boot 228 has a convergent center portion 229. Along an inner diameter 230 of the convergent center portion, an inward facing circumferential or annular groove 232 is positioned. The annular ridge 226 is sized to fit snugly within and around the annular groove 226.

Figure 6:
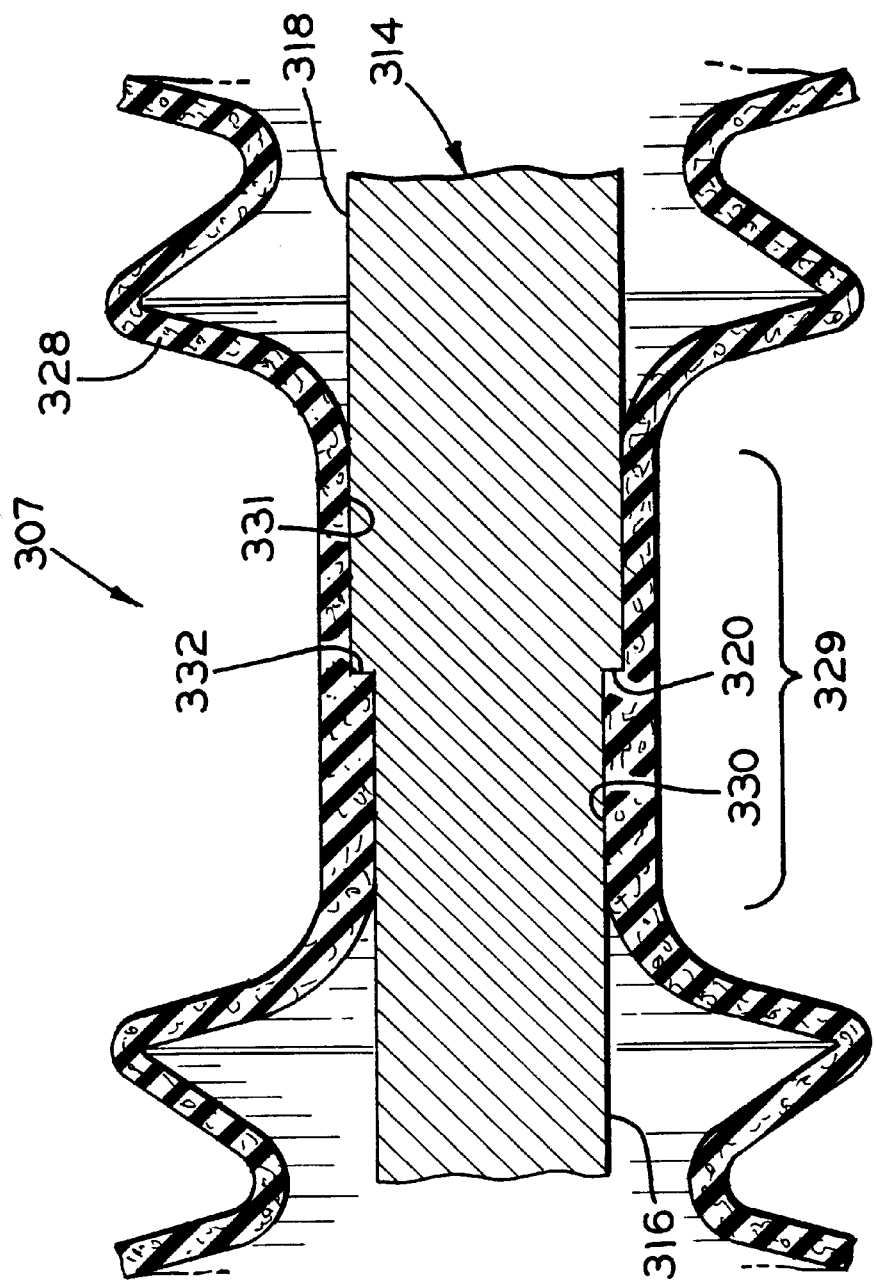
FIG. 6 is a view similar to FIG. 4 of yet another embodiment of a half shaft assembly according to the present invention.

In the embodiment shown in FIG. 6, half shaft assembly 307 is similar to the half shaft assembly 107 shown in FIG. 4, but with the half shaft 314 having a first end 316 with a diameter substantially smaller than the diameter of the second end 318. The difference in diameters of the first and second ends of the half shaft 314 creates an annular shoulder 320. The boot 328 has a convergent center portion 329. The convergent center portion defines two distinct inner diameters, a larger inner diameter 331 and a smaller inner diameter 330, thereby defining a step 332. The step 332 acts with the annular shoulder 320 to form a positive indication that boot 328 and the half shaft 314 are in a predetermined axial location with respect to each other. Therefore, during assembly of the half shaft assembly 307, as the boot 328 is slid or moved along the first end (to the right as depicted in FIG. 6) of the half shaft 314, the boot will be stopped in a defined axial relationship with respect to the half shaft when the boot step 332 meets the half shaft annular shoulder 320.

The principle and mode of operation of this invention have been described in its preferred embodiments. However, it should be noted that this invention may be practiced otherwise than as specifically illustrated and described without departing from its scope.

What is claimed is:

1. An assembly comprising:

first and second joints;

a shaft connected between said first and second joints;

a one-piece boot connected to said first and second joints and extending about said shaft, said boot having an inner surface engaging a portion of said shaft to restrict movement of said boot relative to said shaft.

2. The assembly defined in claim 1 wherein said shaft has a groove formed therein, and wherein said inner surface of said boot engages said groove.

3. The assembly defined in claim 1 wherein said shaft has a ridge formed therein, and wherein said inner surface of said boot engages said ridge.

4. The assembly defined in claim 1 wherein said shaft has a shoulder formed therein, and wherein said inner surface of said boot engages said shoulder.

5. The assembly defined in claim 1 wherein said first and second joints are universal joints.

6. The assembly defined in claim 5 wherein said first and second universal joints are constant velocity universal joints.

7. The assembly defined in claim 1 wherein said boot has a first end portion that extends about said first joint and a second end portion that extends about said second joints.

8. The assembly defined in claim 7 wherein said first and second end portions are convoluted.

9. The assembly defined in claim 7 wherein said boot has a hollow cylindrical portion that extends between said first and second end portions.

10. The assembly defined in claim 1 wherein said boot is formed from an elastomeric material.

* * * * *